(12) United States Patent
Riggs et al.

(10) Patent No.: US 8,671,351 B2
(45) Date of Patent: Mar. 11, 2014

(54) APPLICATION MODIFICATION BASED ON FEED CONTENT

(75) Inventors: Brian Riggs, San Francisco, CA (US); George Craig Barberich, San Anselmo, CA (US); Daniel J. Cooley, San Francisco, CA (US); Joel Huff, San Francisco, CA (US)

(73) Assignee: Adobe Systems Incorporated, San Jose, CA (US)

( * ) Notice: Subject to any disclaimer, the term of this patent is extended or adjusted under 35 U.S.C. 154(b) by 603 days.

(21) Appl. No.: 12/605,446

(22) Filed: Oct. 26, 2009

(65) Prior Publication Data

US 2010/0138753 A1 Jun. 3, 2010

Related U.S. Application Data

(63) Continuation of application No. 11/585,326, filed on Oct. 23, 2006, now Pat. No. 7,631,260.

(51) Int. Cl.
*G06F 3/00* (2006.01)

(52) U.S. Cl.
USPC ............ 715/762; 715/234; 715/255; 715/730

(58) Field of Classification Search
USPC ......... 715/200–205, 210, 226, 229, 231, 234, 715/243, 253, 255, 256, 273, 700, 730, 731, 715/760, 209, 240, 738, 747, 762
See application file for complete search history.

(56) References Cited

U.S. PATENT DOCUMENTS

| | | | |
|---|---|---|---|
| 6,760,916 B2 | 7/2004 | Holtz et al. | |
| 6,791,581 B2 | 9/2004 | Novak et al. | |
| 7,095,401 B2 | 8/2006 | Liu et al. | |
| 7,210,039 B2 | 4/2007 | Rodgers et al. | |
| 7,320,109 B1* | 1/2008 | Zeevi et al. | 715/763 |
| 7,412,534 B2* | 8/2008 | Tsang et al. | 709/231 |
| 7,458,020 B2* | 11/2008 | Novak et al. | 715/234 |
| 7,543,235 B2* | 6/2009 | Novak et al. | 715/744 |
| 7,917,860 B2* | 3/2011 | Gossman | 715/760 |
| 8,020,106 B2* | 9/2011 | Diab et al. | 715/760 |
| 2002/0069218 A1 | 6/2002 | Sull et al. | |
| 2003/0001880 A1 | 1/2003 | Holtz et al. | |
| 2003/0093810 A1 | 5/2003 | Taniguchi | |

(Continued)

OTHER PUBLICATIONS

"International Search Report in Intl Application PCT/US2007/082301", mailed Oct. 21, 2008.

(Continued)

*Primary Examiner* — Maikhanh Nguyen
(74) *Attorney, Agent, or Firm* — Kilpatrick Townsend & Stockton LLP

(57) ABSTRACT

A data format provides a mechanism to dynamically change the appearance of an application. During operation, the application obtains streaming feed data for presentation to a user. The feed data may be formatted according to a Really Simple Syndication (RSS) data format. The application detects, within the feed data, branding extensions that identify branding content to be displayed concurrently with channel data and content items when a user selects a channel defined by the feed data. The application detects a user selection of the channel defined by the feed data, and in response, references the branding extensions to obtain and display the branding content within a display region of the application that is separate from the content presentation region of the application for display of content items defined within the feed data.

12 Claims, 7 Drawing Sheets

(56) References Cited

U.S. PATENT DOCUMENTS

| | | |
|---|---|---|
| 2004/0210825 A1 | 10/2004 | Novak et al. |
| 2005/0144258 A1 | 6/2005 | Burckart et al. |
| 2005/0210398 A1* | 9/2005 | Novak et al. ................ 715/765 |
| 2005/0289147 A1* | 12/2005 | Kahn et al. .................... 707/10 |
| 2005/0289468 A1* | 12/2005 | Kahn et al. .................. 715/738 |
| 2005/0289474 A1 | 12/2005 | Master et al. |
| 2006/0129917 A1* | 6/2006 | Volk et al. .................... 715/513 |
| 2006/0155698 A1* | 7/2006 | Vayssiere ......................... 707/6 |
| 2006/0167860 A1* | 7/2006 | Eliashberg et al. .............. 707/3 |
| 2006/0230021 A1* | 10/2006 | Diab et al. ........................ 707/3 |
| 2006/0265662 A1* | 11/2006 | Gertzen ........................ 715/760 |
| 2006/0282822 A1* | 12/2006 | Weng ........................... 717/114 |
| 2007/0061711 A1* | 3/2007 | Bodin et al. .................. 715/523 |
| 2007/0083520 A1* | 4/2007 | Shellen et al. ................. 707/10 |
| 2007/0088832 A1* | 4/2007 | Tsang et al. .................. 709/227 |
| 2007/0100959 A1* | 5/2007 | Eichstaedt et al. ........... 709/217 |
| 2008/0109528 A1 | 5/2008 | Knight et al. |

OTHER PUBLICATIONS

"RSS Feed", http://en.wikipedia.org/wiki/RSS_(file_format).

* cited by examiner

APPLICATION MODIFICATION BASED ON FEED CONTENT

CROSS REFERENCE TO RELATED APPLICATIONS

This Application is a Continuation of U.S. patent application Ser. No. 11/585,326 filed on Oct. 23, 2006, now U.S. Pat. No. 7,631,260, the contents of which are incorporated herein by reference in their entirety.

BACKGROUND

Computer networks allow the distribution of information between many numbers of computer systems. Various computer program applications (i.e. software) and data communications protocols support a wide variety of different types of data communications and information exchange. As an example, a computer user using a web browser software application that operates on a local computer system can communicate using a hypertext transport protocol with remote computer systems known as web servers over a computer network such as the Internet to obtain web page content for viewing by the user on a local computer system. Other types of communication mechanisms include electronic mail, instant messaging, voice over network communication, and so forth.

One type of communication mechanism that is becoming popular is "syndicated streaming" or "feed" communication that allows a computer program known as a streaming feed reader or aggregator to operate on a networked computer system to periodically check a list of syndicated stream data "feeds" on behalf of a user and display any updated articles or other content that the application finds within those feeds. Feed readers or aggregators are able to subscribe to streaming data feeds that are essentially specially formatted files provided from remote computer systems such as web sites or other servers that are of interest to a user operating the aggregator. A set of standardized data formats collectively known as Really Simple Syndication (RSS) provide a simple extensible markup language (XML) based system that allows content or feed providers to identify available "channels" of content items in one of the RSS formats and allows users to subscribe to their favorite websites using the aggregator application. The aggregator is able to read the RSS formatted feed(s) selected by the user to list available content items within each channel (i.e. within each feed) for viewing by the user. Using RSS, webmasters or other content providers can thus put their content items into a standardized RSS data format (an XML format conforming to standard tags and conventions to list and describe content items), which can be accessed, viewed and organized through RSS-aware aggregator software or automatically conveyed as new content on another website.

A typical RSS streaming data feed comprises an XML file that defines a channel, and which RSS standardized tags to define a title, link, description, and other optional fields/tags, followed by a series of content items, each of which have a set of tags used to indicate a title, link, and description of that content item. There can be many sets of content items (i.e. title, link and description tags with other optional fields/tags) in a single feed file and the RSS formatted files conform to one of several different standard RSS XML data formats (examples of which include RSS 1.0, RSS 2.0, Atom 0.3, and Atom 1.0). It is now common to find RS (examples of which include RSS 1.0, RSS 2.0, Atom 0.3, and Atom 1.0)S web feeds available for access on major or popular websites as well as on many smaller or less popular ones. RSS-aware aggregator or feed reader programs are available for download to various operating systems such as Windows and MacOS. Client-side RSS-based readers and aggregators are typically constructed as standalone programs or extensions to existing programs such as web browsers and are able to interpret the RSS data format to present the channels and associated content items for selection by a user for viewing.

Any type of content that can be broken down into discrete content items can be syndicated via RSS. As an example, content such as recent changes to a web page such as a weblog, a revision history of a book, or new episodes of a TV show, new songs available from an artist, or the like can each be identified and formatted into an RSS feed. Once information about each content item is in RSS format, an RSS-aware program such as an aggregator can periodically check one or more feeds for changes and react to the changes in an appropriate way such as by displaying the newly available content selections for access by the user. Popular websites that are continuously developing new content for viewing by a user utilize RSS streaming data feeds to publish the content for access by aggregator applications operated by users who are interested in keeping up with current content available from those sites. A user may subscribe to many different feeds, each also known as a channel.

A typical aggregator program provides a graphical user interface that includes multiple display regions. A channel display region identifies various RSS feeds or "channels" that the user has configured the aggregator to obtain. When a user selects a particular channel in the channel display region, a content item selection region of the graphical user interface displays content items (e.g. as thumbnail icons, lists, or other list-oriented views) available from the channel (i.e., items described in the RSS data format for that feed). As an example, if the user selects a news channel from the channel selection region, the aggregator application will obtain the current RSS feed for that news channel and will display available content selections such as recent new stories within the content selection region. Each content item can be shown, for example, as a thumbnail or icon or textual line item representing content available for presentation to the user if the user were to chose that content item icon. The content item selections for a particular channel are independently identified within the RSS data format. Once the content items for a particular channel are shown for selection by the user, the user may then select a particular content item from the content selection region. In response, the aggregator will then obtain that item of content (e.g., by referencing a URL encoded within the RSS data format for that content item) and will play or otherwise reproduce or present that content in a content presentation display region (e.g., a play window) on the graphical user interface of the aggregator. Often the content items are videos or multimedia presentations, though they may be simply web pages or static text or audio. If the user selects a different channel from the channel selection region, the aggregator will read the current feed for that channel and change the content items within the content selection region to show the current content items available for the new channel selection. Again, the user may select a particular content item associated with that channel for viewing and the aggregator will access that particular content item and play that content in the content presentation region.

SUMMARY

Conventional techniques for displaying syndicated feed content for presentation to a user suffer from a variety of deficiencies. In particular, standardized syndication data formats such as RSS do not include the ability to add any embedded modification information into the data format to identify graphical or other modifications that are to be made to displayed portions of the application that are distinct from content presentation display regions of the application. That is, current versions of RSS do not provide the ability to include branding extensions that the RSS-aware application can interpret to modify its graphical appearance or "application chrome" upon selection of a particular RSS feed by a user. Thus, conventional RSS-aware applications such as aggregators provide the same look and feel no matter which channel is selected by a user and no matter what content item the user is viewing. This is because no extensions to RSS have been developed or provided that allow branding data to be specified that can be interpreted by the application to cause the application to change its look or feel and to become "branded" with a look associated with the channel or content that is currently selected. As used herein, RSS refers to any variant of a data format to syndicate and provide content over a computer network such as the Internet. RSS as used herein thus generally includes RSS and RDF data formats promulgated by organizations such as Netscape Corporation and UserLand Software, as well as equivalents thereto.

While some applications have promoted RSS extensions to include extra metadata about the content in the RSS feed, such metadata is used in the other ways such as providing additional text content concerning a channel or content items for display in the content selection region of the applications user interface. No conventional applications support or provide a data format that enables a content owner to provide an RSS data format to brand or cause an application to modify the entire application chrome (or a part of the application such as window appearance, color, control style, skin, etc.) based on the branding extensions contained within the RSS feed as described and disclosed herein. By application chrome or branding content, was meant in one example is content to change the entire look and feel of application including the color, size and shape of the window, or a skin or style and surrounding region of the application, as well as the look and feel of various display regions, buttons or other controls within the application. A common term of art that is similar to application chrome is an application "skin". Embodiments disclose herein thus allow dynamic modification of an RSS-aware application based on branding extensions contained within RSS streaming data feeds that are specific to that feed or to individual content items identified within that feed.

More specifically, embodiments of the invention provide a rendering application such as an aggregator or RSS streaming data feed reader that operates to obtain content for presentation to a user. The content may be, for example, a set of one or more streaming data feeds. Each streaming data feed is arranged in a syndicated markup language format (e.g., any RSS XML type format or variant thereof) that identifies a channel and content items available for selection and viewing by a user of the application and that has embedded modification information such as branding extensions defined and disclosed herein. The application detects, within the content, the embedded modification information that identifies graphical modifications to be made to displayed portions of the application that are separate from a content presentation region of the application. For example, the application can identify the embedded modification information as branding extensions within at least one streaming data feed. Each branding extension for a streaming data feed includes a branding tag providing an identification of a display region (e.g. background, window, border, title bar, specific display region(s), etc.) of the application to which branding content associated with that branding extension is to be applied. Additionally, each branding extension for a streaming data feed includes a branding content reference such as a URL to branding content that can be obtained and then displayed in the identified display region (the region identified by the branding tag) of the application in response to the application receiving a selection from the user to view content associated with that streaming data feed. As an example, an XML branding tag "backgroundimage" (prefaced by a "branding" namespace identifier) and branding content URL reference may appear as follows within an RSS data format: <branding:backgroundimage url=http://www.pictures.com/backgroundpicture.jpg>

The rendering application references the embedded modification information within the content to obtain the graphical modifications (e.g. to obtain the background picture in this example referenced at the specified URL) to be made to display region(s) of the application that are separate from the content presentation region of the application. In other words, the display regions effected by the branding content are regions such as the overall look and feel of application buttons, borders, colors, background, etc. These are display regions of the application that content items such as videos or web page content items identified within an RSS streaming data feed would not normally effect. The branding extensions thus trigger application functionality outside of rendering content items in an RSS data format within the standard content presentation area (e.g. within the standard playback window).

The rendering application alters at least one display region of the application that is separate from the content display region of the application in accordance with the graphical modifications identified by the embedded modification information within the content. In this manner, the branding extensions can change the skin or style (i.e., the chrome) of an application itself (or a portion thereof) to reflect a brand or look and feel that a content producer desires to have associated with the channel or content items of a channel that a user may select. Example display regions that the application can modify based on the branding extensions including, for example, i) an application window border display region that surrounds the application (or that surrounds different display regions of the application); ii) a channel presentation display region of the application in which the streaming data feed may be selected as a channel from a plurality of streaming data feeds; iii) a content item selection display region of the application that indicates content items associated with a selected channel for a streaming data feed that the user may select for viewing; iv) an application control display region that displays controls operable to control the application; and/or v) a background image display region in which the application can display a background image identified by the branding content. Other areas can be modified as well, such as application controls, look and feel of pull down menus, and so forth. Additional features of embodiments disclosed herein will be described more fully in the detailed description section.

Other embodiments disclosed herein also include a configuration of one or more computerized devices, computer systems, workstations, handheld or laptop computers, cell phones, personal digital assistants, or the like to carry out and/or support any or all of the method operations disclosed herein. In other words, one or more of such computerized devices can be programmed and/or configured to operate as explained herein to carry out different embodiments of the invention.

Yet other embodiments herein include software programs to perform the steps and operations summarized above and disclosed in detail below. One such embodiment comprises a computer program product that has a computer-readable medium including computer program logic encoded thereon that, when performed in a computerized device having a processor and corresponding memory, provides one or more processes that program the processor to perform the operations disclosed herein. Such arrangements are typically provided as software, code and/or other data (e.g., data structures) arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC). The software or firmware or other such configurations can be installed onto a computerized device to cause the computerized device to perform the techniques explained herein.

Accordingly, one particular embodiment of the present application is directed to a computer program product that includes a computer readable medium having instructions stored thereon for performing operations as explained herein related to processing branding extensions. Other embodiments of the present application include software programs to perform any of the method embodiment steps and operations summarized above and disclosed in detail below.

As discussed above, techniques herein are well suited for use in producing and processing branding extensions. However, it should be noted that embodiments herein are not limited to use in such applications and that the techniques discussed herein are well suited for other applications as well. Note that each of the different features, techniques, configurations, etc. discussed herein can be executed independently or in combination and via a single software process on in a combination of processes, such as in client/server configuration.

It is to be understood that the system herein can be embodied strictly as a software program or application, as software and hardware, or as hardware alone such as within a processor, or within an operating system or a within a software application. Example embodiments of the invention may be implemented within products and/or software applications such as those manufactured by Adobe Systems, Inc. of San Jose, Calif., USA.

Additional features of the embodiments herein will be further discussed in the Detailed Description section of this application and accompanying figures and the aforementioned summary is not intended to limit the scope of the invention.

BRIEF DESCRIPTION OF THE DRAWINGS

The foregoing and other objects, features, and advantages of the invention will be apparent from the following more particular description of preferred embodiments herein, as illustrated in the accompanying drawings in which like reference characters refer to the same parts throughout the different views. The drawings are not necessarily to scale, with emphasis instead being placed upon illustrating the embodiments, principles and concepts.

DETAILED DESCRIPTION

Generally, embodiments disclosed herein provide a data format for content obtained over a network that provides a mechanism to dynamically change the appearance of an application as the user changes content selections. During operation, the application obtains streaming feed data for presentation to a user. The feed data may be formatted according to a Really Simple Syndication (RSS) data format or a variant thereof. The application detects, within the feed data, branding extensions that identify branding content to be displayed concurrently with channel data and content items when a user selects a channel defined by the feed data. The application detects a user selection of the channel defined by the feed data, or a selection of a content item within a channel, and in response, references the branding extensions associated with that channel or that content item to obtain and display the branding content within a display region of the application that is separate from the content presentation region of the application for display of content items defined within the feed data. This allows the appearance, such as the skin or style of the application to change and be "branded" using branding extensions supplied along with the channel and content item data in the RSS feed.

Figure 1:
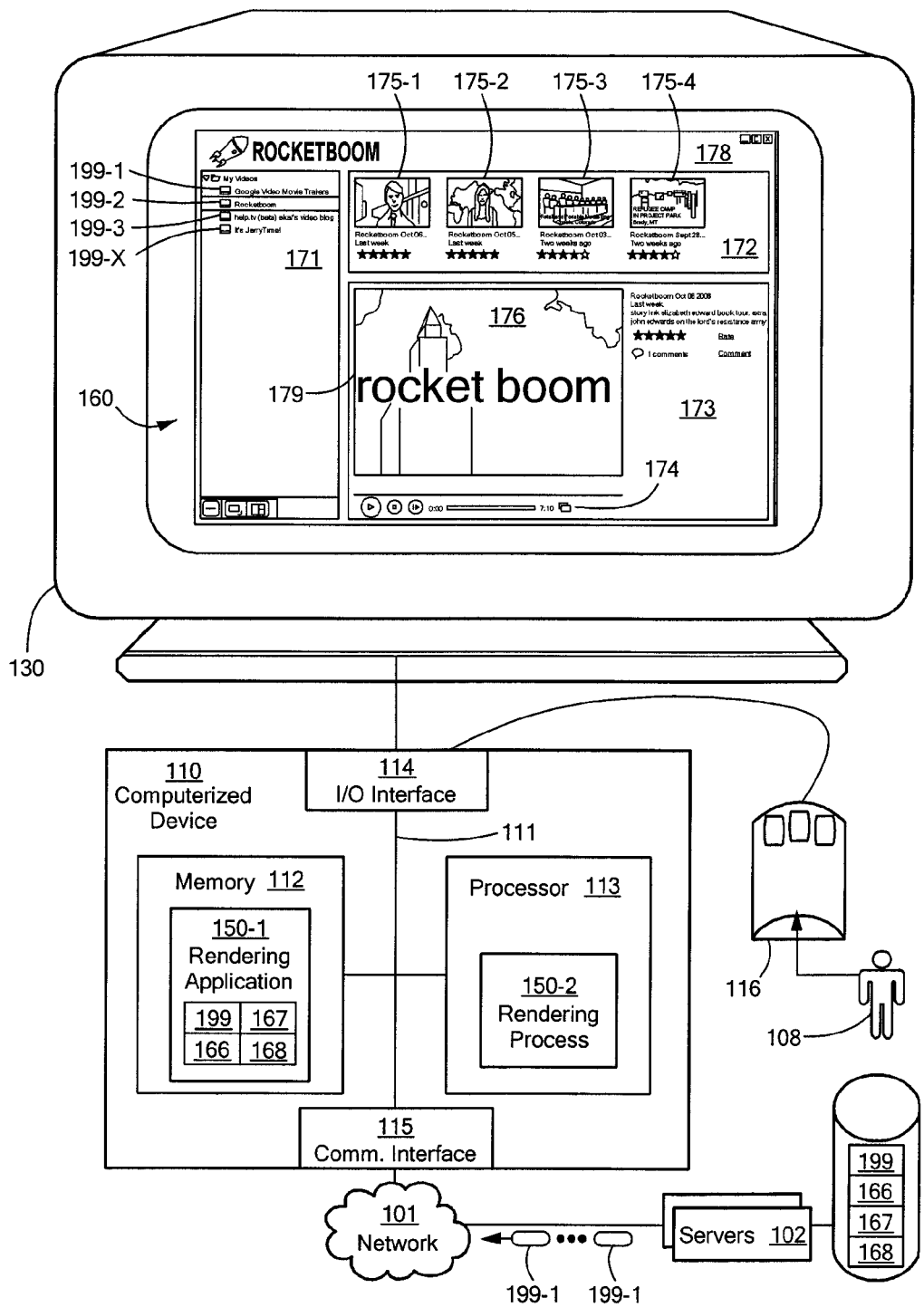
FIG. 1 is a diagram of a computerized device configured with a rendering application that operates to process branding extensions according to embodiments disclosed herein.

FIG. 1 is a block diagram illustrating example architecture of a computer system or computerized device 110 that executes, runs, interprets, operates or otherwise performs a rendering application 150-1 and a rendering process 150-2 configured in accordance with embodiments of the invention. The computer system 110 may be any type of computerized device such as a personal computer, workstation, portable computing device (e.g. cell phone, personal digital assistant, etc.), console, laptop, network terminal or the like. As shown in this example, the computer system 110 includes an interconnection mechanism 111 such as a data bus, motherboard or other circuitry that couples a memory 112, a processor 113, an input/output interface 114, and a communications interface 115. Input device 116 couples to the computer system 110 and processor 113 through an input/output (I/O) interface 114 and enables a user 108 to provide input signals and generally control a graphical user interface 160 that a rendering application 150-1 and rendering process 150-2 generates on the computer display 130. The communications interface 115 enables the computer system 110 to communicate with other devices (i.e., other computers) on a network such as the Internet 101 such as server(s) 102.

The memory 112 is any type of computer readable medium (e.g., RAM, ROM, etc.) and in this example is encoded with an rendering application 150-1 that provides software code that supports generation, display, and implementation of functional operations as explained herein. The rendering application 150-1 may be embodied as software code such as data and/or logic instructions (e.g., code stored in the memory or on another computer readable medium such as a removable disk) that supports processing functionality according to different embodiments described herein. During operation of the computer system 110, the processor 113 accesses the memory 112 via the interconnect 111 in order to launch, run, execute, interpret or otherwise perform the logic instructions of the rendering application 150-1. Execution of rendering application 150-1 in this manner produces processing functionality in a rendering process 150-2. In other words, the process 150-2 represents one or more portions or runtime instances of the rendering application 150-1 (or the entire application 150-1) performing or executing within or upon the processor 113 in the computerized device 110 at runtime. The term rendering application 150 as used herein is to be understood to refer to either or both of the rendering application 150-1 (as code in memory) or the rendering process 150-2 (the executing version of this code).

Figure 2:
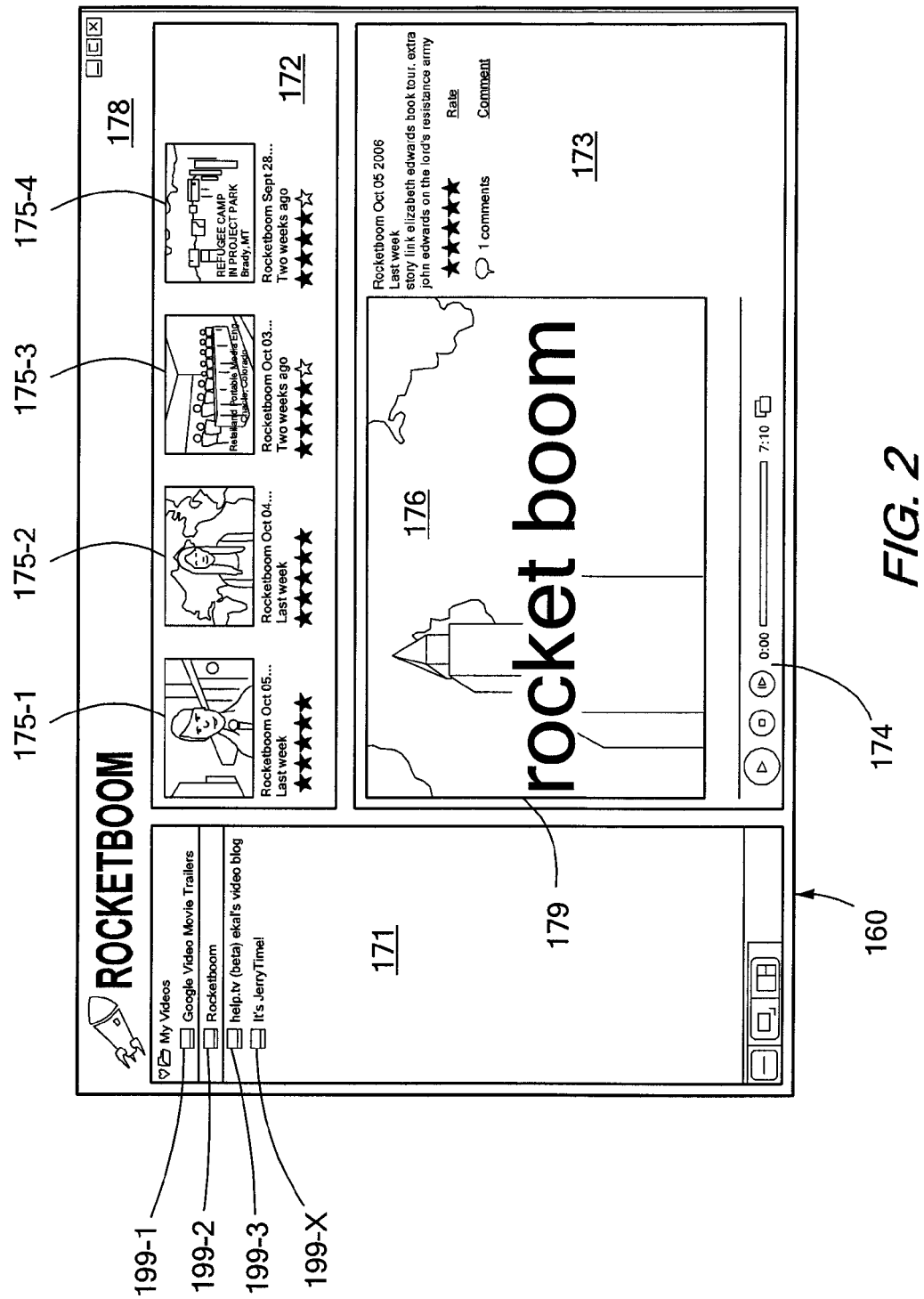
FIG. 2 is an enlarged view of the graphical user interface of the rendering application as shown in FIG. 1.

Generally, when the rendering application 150 is operating, a user 108 controls the rendering application 150 to subscribe to one of more streaming data feeds or channels 199-1 through 199-X provided by one or more servers 102. The graphical user interface 160 shows the channels 199-1 through 199-X that the user in this example has subscribed to. The streaming data feeds 199 (i.e., each channel) may be RSS feeds, for example, and each represents a channel and contains an encoding of a set of content items 175 available from that channel. During operation, the rendering application 150 presents the graphical user interface 160 in the display 130 of the computerized device 110 and displays each content item 175-1 through 175-M for the selected channel 199-2. In this example, the rendering application 150 is an RSS-aware streaming data feed aggregator. The user 108 has thus configured this example RSS application 150 to subscribe to several channels 199-1 through 199-X (only a few have reference numerals shown by way of example only) as shown in the channel selection display region 171 of the graphical display 160. In this example graphical user interface 160 as shown in FIG. 1 (and as shown in more detail in FIG. 2), the user 108 has selected channel 199-2 entitled "Media Corp" and in response, the rendering application 150 has obtained the RSS data format (example shown below) for that channel 199-2 which identifies many content items 175-1 through 175-M in the content item selection region 172. Also in this example, the user 108 has selected content item 175-2 in response, the rendering application 150 presents (i.e., plays) the content 176 (a video in this example) associated with that content item 175-2 in the content presentation display region 173 of the graphical user interface 160. FIG. 2 is an enlarged view of the graphical user interface 160 in FIG. 1.

An example RSS XML streaming data feed format for channel 199-2 as shown in the graphical user interface 160 in FIGS. 1 and 2, including the embedded modification extensions (i.e., branding extensions) disclosed herein, is shown as follows:

```
<rss version="2.0" xmlns:media="http://search.yahoo.com/mrss"
xmlns:itunes="http://www.itunes.com/dtds/podcast-1.0.dtd"
500: xmlns:branding="http://www.adobe.com/2006/branding/">
<channel>
<title>MediaCorp</title>
<link>http://www.MediaCorp.com/vlog/</link>
<description>Daily with Jeannine Clark</description>
<copyright>Copyright 2006</copyright>
<lastBuildDate>Fri, 06 Oct 2006 08:27:28.-0500</lastBuildDate>
501: <branding:backgroundImage url="http://www.MediaCorp.com/background.jpg"/>
<image>
<url>http://10.132.64.127/feeds/MediaCorp/images/MediaCorp_logo.jpg</url>
<title>MediaCorp</title>
<link>http://www.MediaCorp.com</link>
</image>
<item>
<title>MediaCorp Oct 05 2006</title>
<description>
story link: MediaCorp tour.
</description>
<link>http://www.MediaCorp.com/vlog/archives/2006/10/111</link>
<guid>http://www.MediaCorp.com/vlog/archives/2006/10/111</guid>
<category>daily</category>
<pubDate>Thu, 05 Oct 2006 12:21:30 -0500</pubDate>
<enclosure
url="http://10.132.64.127/feeds/MediaCorp/MediaCorp-10-5-06.flv"
length="10000"
type="video/x-flv"/>
<media:group>
<media:content
url="http://10.132.64.127/feeds/MediaCorp/MediaCorp-10-5-06.flv"
type="video/x-flv" isDefault="true" expression="full"/>
</media:group>
<media:title>MediaCorp Oct 05 2006</media:title>
<media:thumbnail
url="http://10.132.64.127/feeds/MediaCorp/images/MediaCorp_thumb_10_5.jpg"/>
</item>
<item>
<title>MediaCorp Oct 04 2006</title>
<description>
Field correspondent Joe interviews at college campus
</description>
<link>http://www.MediaCorp.com/vlog/archives/2006/10/112</link>
<guid>http://www.MediaCorp.com/vlog/archives/2006/10/112</guid>
<category>daily</category>
<pubDate>Wed, 04 Oct 2006 16:38:52 -0500</pubDate>
<enclosure
url="http://10.132.64.127/feeds/MediaCorp/MediaCorp-10-04-06.flv"
length="10000" type="video/x-flv"/>
<media:group>
<media:content
url="http://10.132.64.127/feeds/MediaCorp/MediaCorp-10-04-06.flv"
type="video/x-flv" isDefault="true" expression="full"/>
</media:group>
<media:title>MediaCorp Oct 04 2006</media:title>
<media:thumbnail
url="http://10.132.64.127/feeds/MediaCorp/images/MediaCorp_thumb_10_4.jpg"/>
</item>
</channel>
</rss>
```

Those skilled in the art will recognize most of above data format as standard RSS 2.0 data format. However, note that in the above example, numeric references 500 and 501 (shown underlined and in bold above) designate additional embedded modification information or branding extensions in the content (i.e. in the RSS data format) that is provided by embodiments disclosed herein and that serves to reference branding content for this channel. In particular, reference line 500 defines a branding namespace for and reference line 501 defines a branding extension (a namespace and tag and URL reference) that specifies a certain background image that is to be used by the rendering application 150 when the user of the display 160 selects this channel 199-2. The resulting effect of these branding extensions 500 and 501 are shown in the example graphical user interface 160 in FIGS. 1 and 2 as the "Media Corp." title bar 178 and as a color change applied to the borders 179 between the display regions 171, 172 and 173 of the graphical user interface 160. In other words, the branding extensions 500 and 501 in this simple example allow the rendering application 150 to interpret this information and alter the entire background image shown by the rendering application 150 on the graphical user interface 160 (i.e. an image shown behind the display regions 171, 172 and 173) to conform to the image specified by the URL at branding extension reference 501 when the user 108 operates the rendering application 150 to select the "Media Corp" channel 199-2 having the above RSS data format including the example branding extensions 500 and 501.

Figure 3:
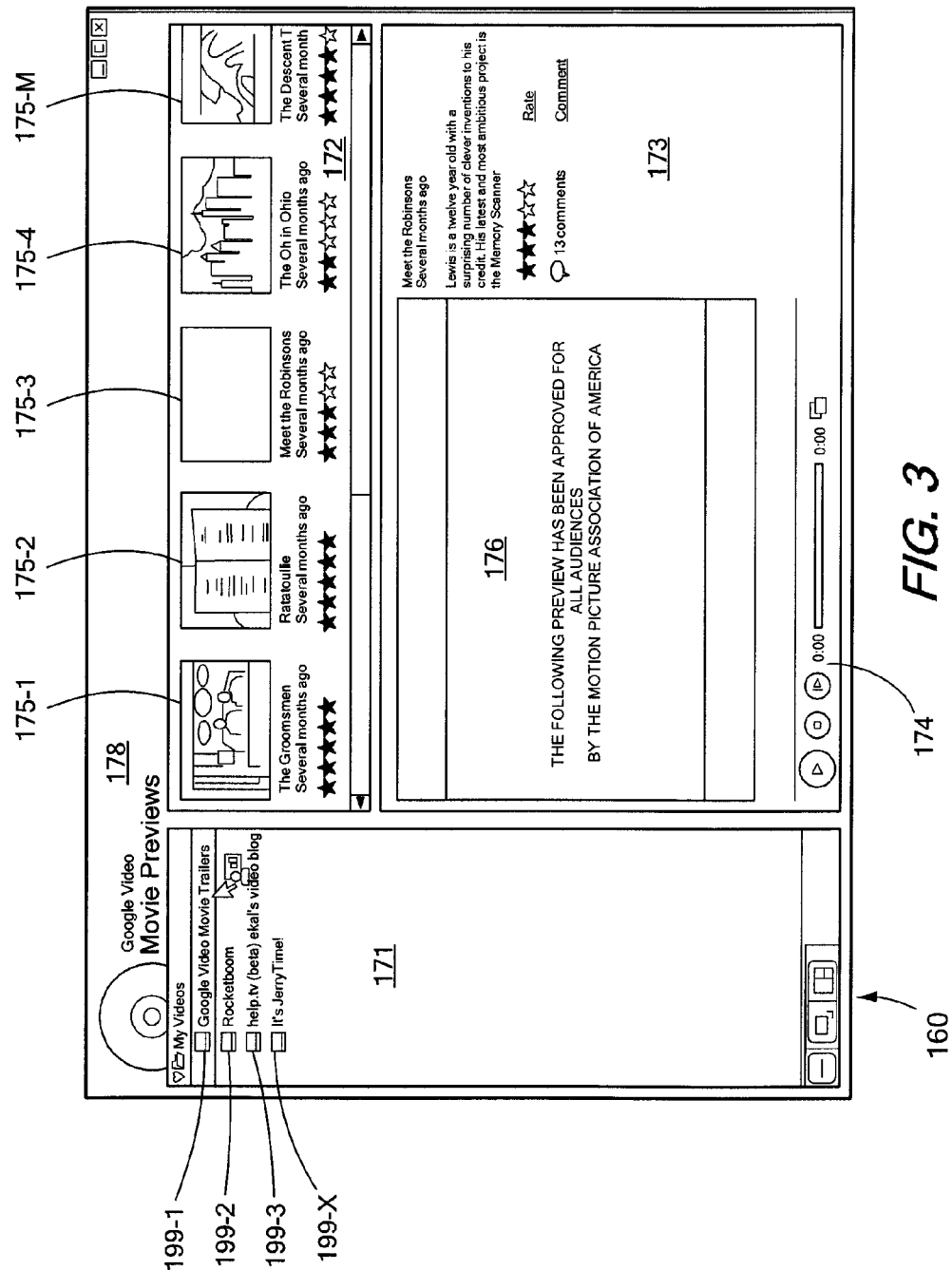
FIG. 3 is an enlarged view of a resultant graphical user interface of the rendering application when a user selects another channel that has different branding extensions embedded in the data format.

FIG. 3 illustrates another graphical user interface 160 for a different selected channel 199. In the example in FIG. 3, the streaming data feed 199-2 (i.e. the data format) for the selected channel includes branding extensions 500 and 501 similar to those of the interface in FIG. 1, except that the branding extension 501 for the channel 199-1 reference different branding content as a background image and have different colors in the regions 171, 172 and 173. Thus, the graphical user interface 160 in FIG. 2 has a "Google Video Movie Previews" background image and color scheme that provides a look and feel, or a "brand" for this channel when that channel is selected in the graphical user interface 160. Note that Google is a registered trademark of Google Inc., of Mountain View, Calif., USA.

While the example branding extension shown in the data format above modified a background image, other areas of the graphical user interface can be modified by branding extensions corresponding to this areas. As an example, branding extensions can exist in the data format of a channel 199 for modifying the look and feel (e.g. style and/or skin) of various interface properties. Example button properties for which branding extensions can exist to modify the look and feel of buttons can include border colors, colors, fill colors/alphas, highlight alphas, focus rectangles, fonts, padding, horizontal and vertical gaps, and text alignment. Panel or window properties for which branding extensions can exist include, for example, background colors and alphas, background images in absolute or relative URL formats (as in the example), border color/style/thickness, corner radius settings, fonts, padding, transparency of modal dialogs, horizontal and vertical alignment of sub-controls, scroll bar appearance, drop shadows, and so forth. It is understood that this list is not meant to be limiting of the types of interface components that can be adjusted or modified in response to detecting branding extensions. Also note that branding extensions can apply branding content to small or large portions, regions or subsets of the graphical user interface 160, or to the entire graphical user interface 160.

Further details of configurations explained herein will now be provided with respect to a flow chart of processing steps that show the operations of embodiments disclosed herein by a rendering application 150 such as an RSS aggregator or other RSS-aware program.

Figure 4:
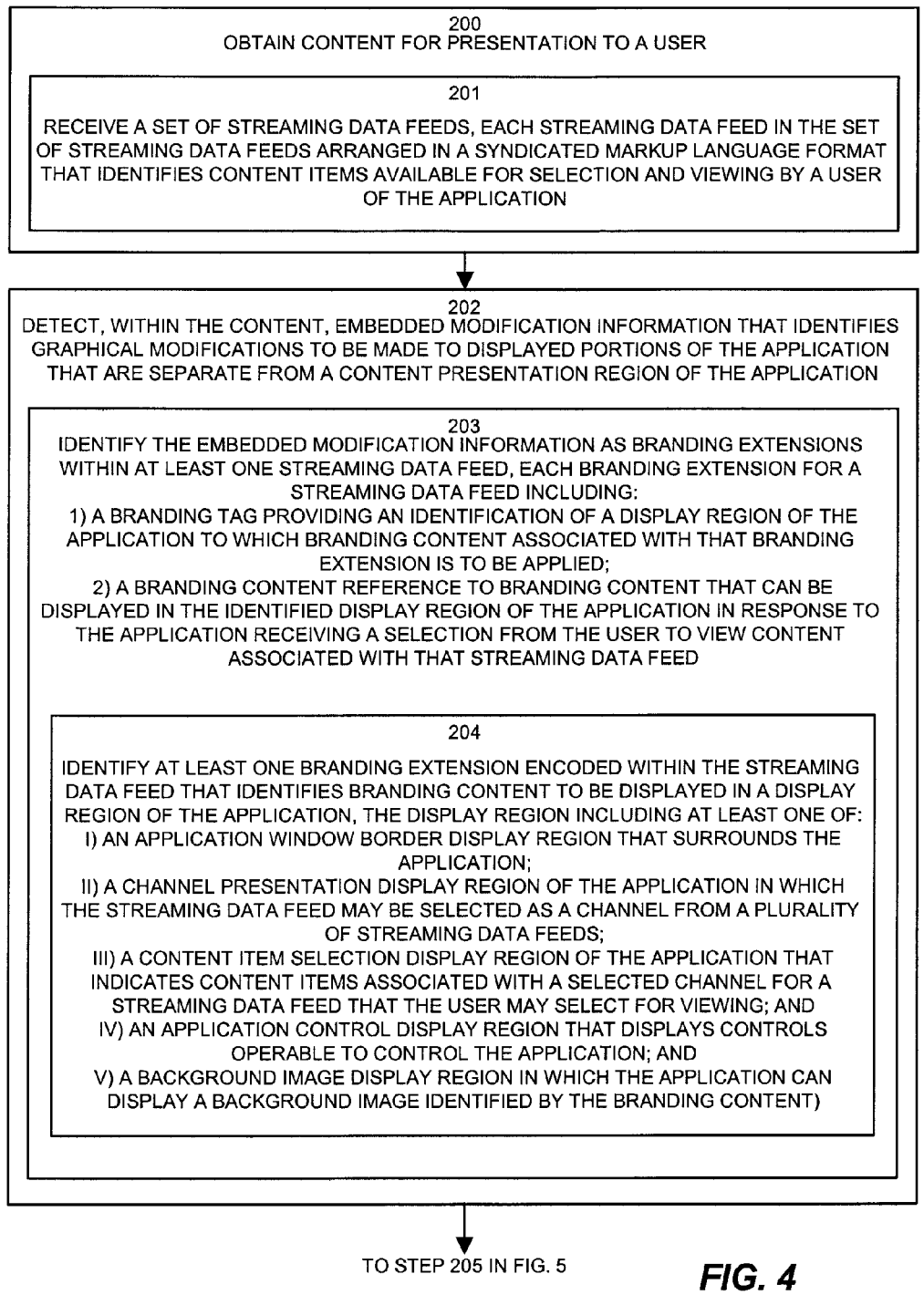
FIGS. 4 through 7 are a flow chart of processing steps that a rendering application performs to detect, interpret and process graphical modification information such as branding extensions within a streaming data feed according to example embodiments disclosed herein.
Figure 5:
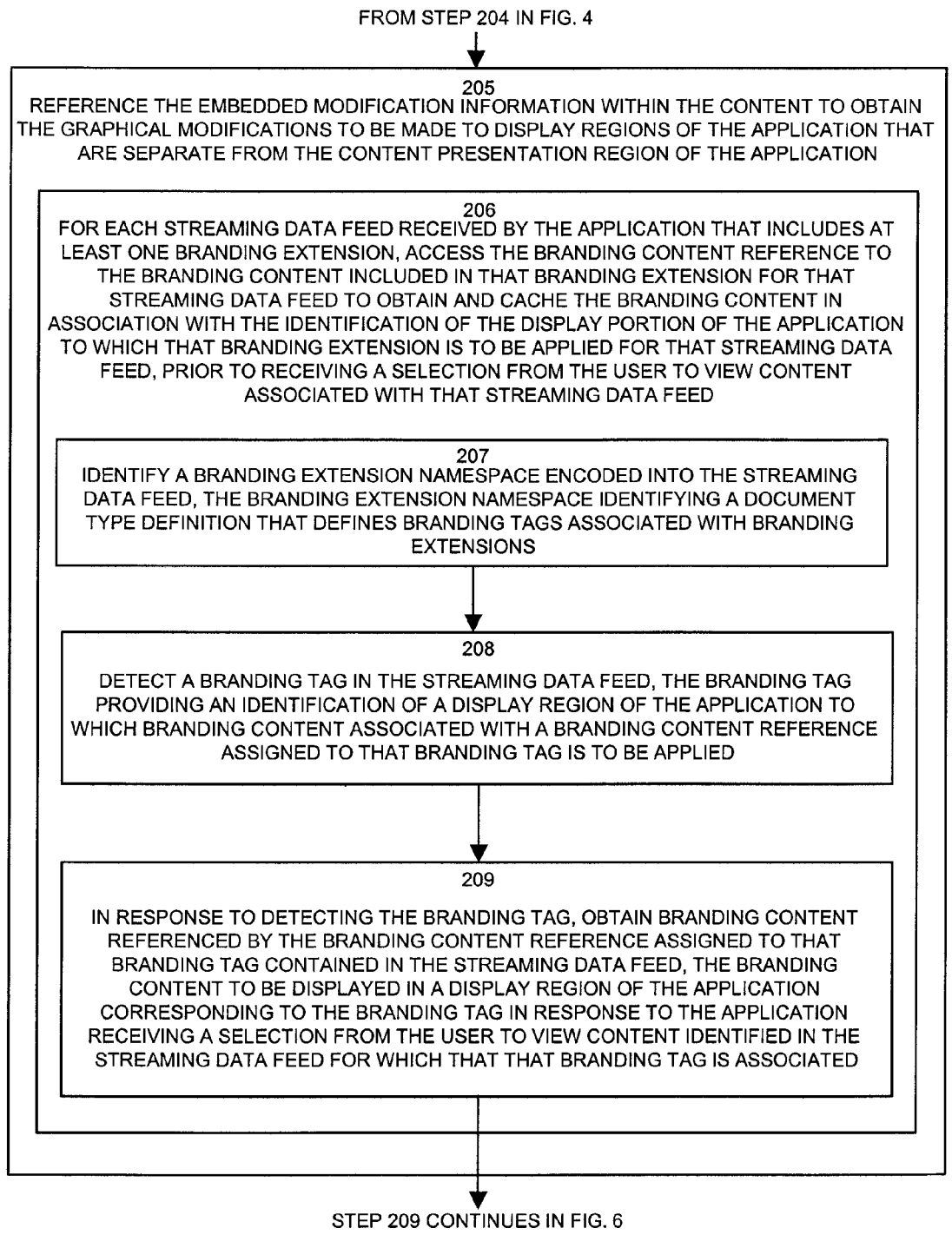
Figure 6:
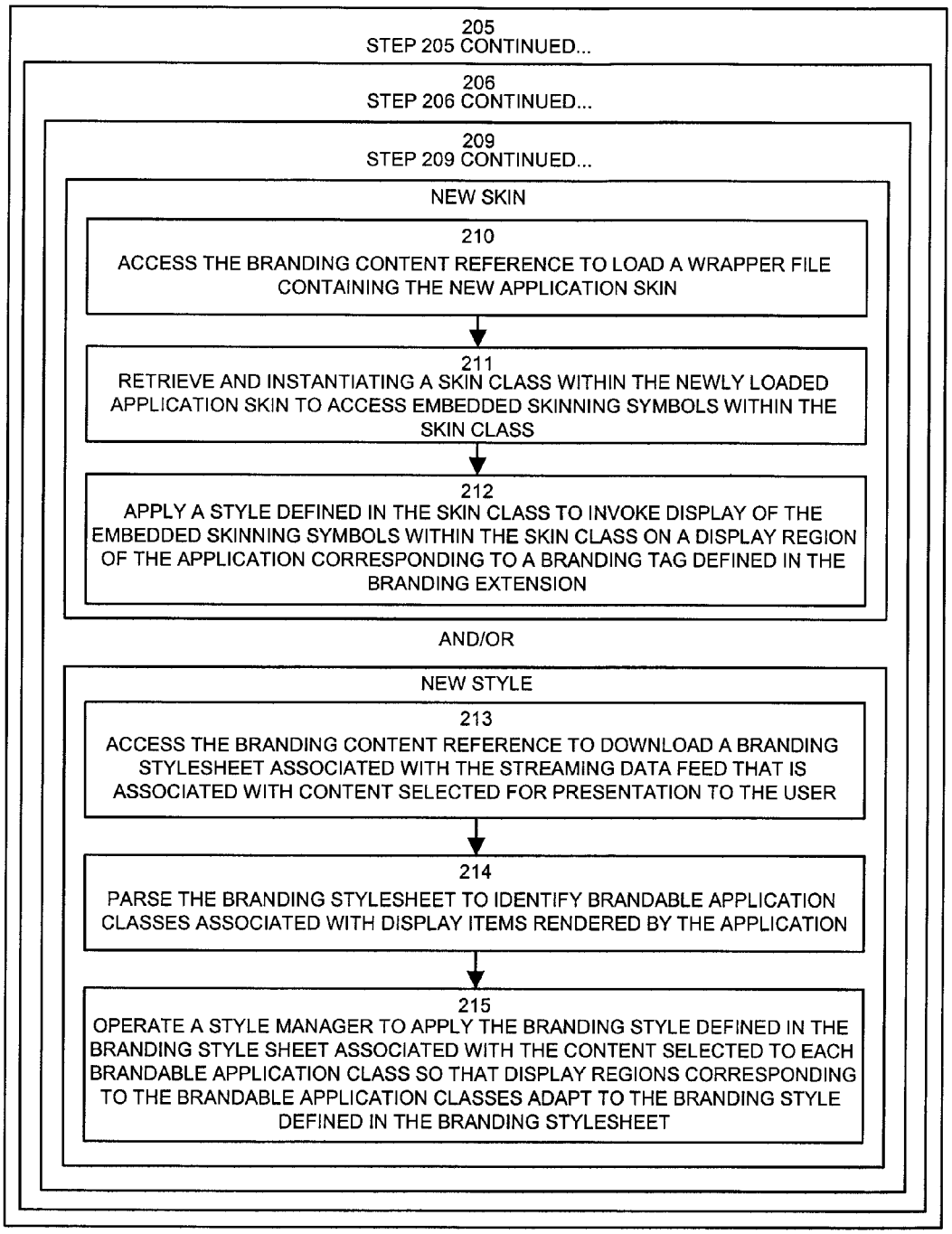
Figure 7:
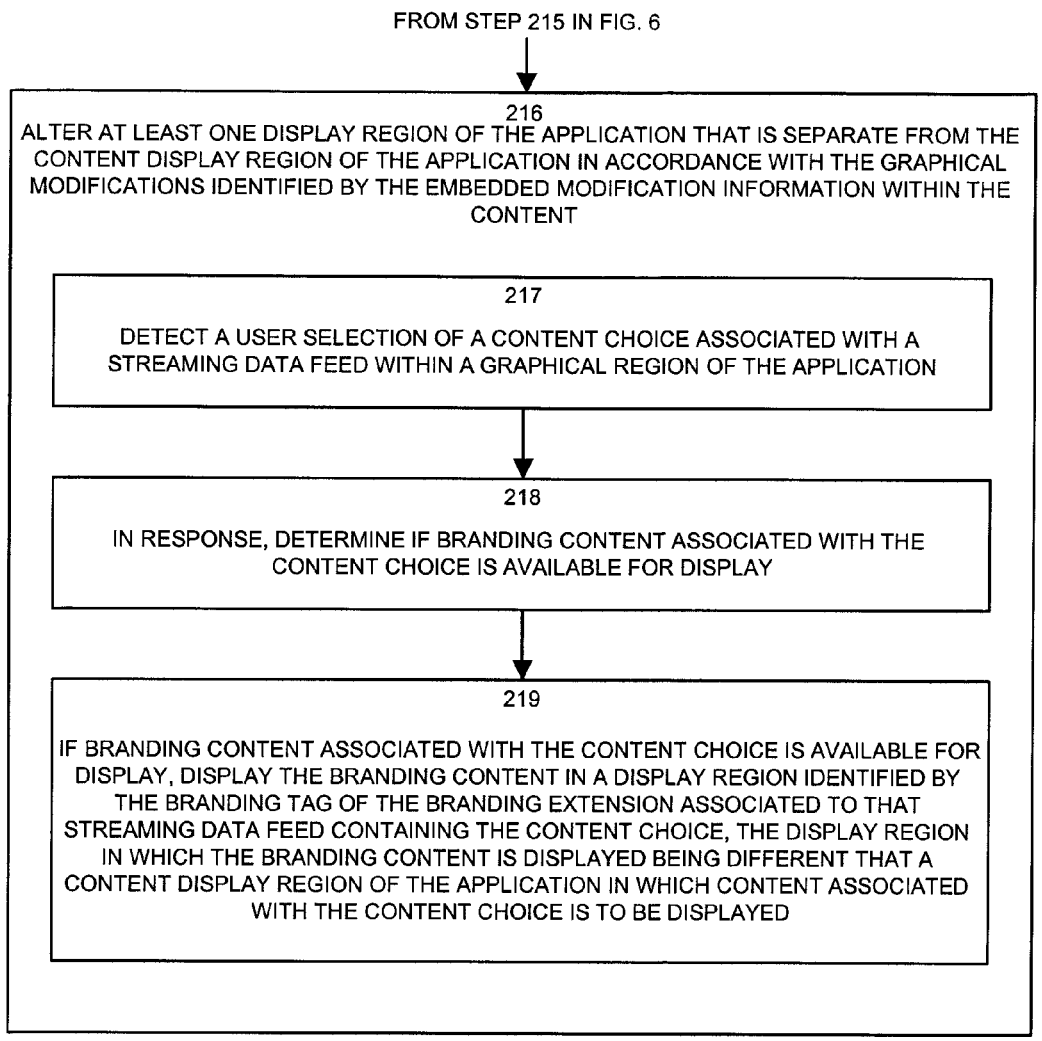

FIG. 4 is a flow chart of processing steps that shows processing performed by a rendering application 150 in accordance with example embodiments disclosed herein.

In step 200, the rendering application 150 obtains content 199 (e.g., an RSS feed) for presentation to a user 108. As explained above, the content 199 may be, for example, channel data 199 defined in a streaming data feed format such as RSS. Sub-step 201 shows further details of processing.

In sub-step 201, the rendering application 150 receives a set of streaming data feed(s) 199, such as RSS feeds 199 (i.e., channels) as shown in FIG. 1. Each streaming data feed 199 in the set of streaming data feeds is arranged in a syndicated markup language format such as RSS or a variant or equivalent thereof that identifies content items 175 available for selection and viewing by a user 108 of the application 150. The above example data format shows an example of the content obtained for presentation to the user via the graphical user interface 160.

In step 202, the rendering application 150 detects, within the content 199, embedded modification information 500, 501 that identifies graphical modifications to be made to displayed portions (e.g. regions 171, 172, 173, 178, etc.) of the application 150 that are separate from a content presentation region 176 of the application. In one configuration, the rendering application 150 detects at least one branding extension 501 within the content. The branding extension 501 includes a branding content reference (e.g. a URL) to branding content (e.g. a picture or other graphic) accessible via a remote computer system (e.g. via the server referenced in the URL). The branding content is displayable within one or more regions (e.g. the background of the entire application in the example graphical user interface 160 in FIG. 1 through 3) of the application 150 and these region(s) are initially rendered with content from the application itself (e.g. they are originally a default setting that is different from the branding content).

In other words, prior to channel selection (or if no branding extensions are present in formerly selected channels), the background is initially set to whatever the application default background is. However, when the branding extensions are received, the extensions 500, 501 modify the application behavior to cause the background image to switch to the image specified in the branding extension in the RSS data feed 199-2 for the example in FIGS. 1 and 2. The branding extensions can exist at the channel level, or on a content item by content item basis within the channel data. Thus, if a user selects a content item, the branding can change to reflect something about that content item. The branding content thus changes as a user selects different content or different streaming data feeds or channels (or content items within those channels) since each RSS feed for each channel (and optionally for each content item within a channel) can specify different branding extensions.

It is to be understood that the branding extensions that modify the background image in the above example are shown a way of example only in that many other aspects of the application 150 may be modified by branding extensions other than the background image alone. As an example, particular display regions 171, 172 and 173 can be selectively referenced by separate branding extensions within a single RSS streaming data feed such that different graphical modifications are made to each of these areas separately. Branding extensions can be developed and included in channel data to very precisely define how different aspects of the application are presented and how they are to operate. Thus branding extensions not only can be used to control the look and feel of the application 150, they can also govern application functionality. Sub-steps 203 and 204 show details of detecting branding extensions in the streaming data feed content 199 in one example configuration.

In sub-step 203, the rendering application 150 identifies the embedded modification information as branding extensions 500, 501 within at least one streaming data feed 199. In one configuration, each branding extension for a streaming data feed includes i) a branding tag 501 providing an identification of a display region (e.g. background image) of the application to which branding content associated with that branding extension is to be applied; and ii) a branding content reference (e.g. URL or other reference) to branding content (e.g. a jpeg image, color, or other marking) that can be displayed in the identified display region (the background in this example) of the application in response to the application receiving a selection from the user 108 to view content associated with that streaming data feed 199-2. It is to be understood that the branding content reference can reference any type of branding content, including an image, a color or color scheme, a web page (e.g. a page to display as background), a video, or audio data and so forth.

In sub-step 204, the rendering application 150 identifies at least one branding extension encoded within the streaming data feed that identifies branding content to be displayed in a display region of the application that may include, for example, one or more of the following: i) an application window border display region 179 that surrounds the application; ii) a channel presentation display region 171 of the application in which the streaming data feed(s) 199 may be selected as a channel from a plurality of streaming data feeds; iii) a content item selection display region 172 of the application that indicates content items associated with a selected channel for a streaming data feed that the user may select for viewing; iv) an application control display region 174 that displays controls operable to control the application; and/or v) a background image display region in which the application can display a background image identified by the branding content.

In step 205, the rendering application 150 references the embedded modification information (i.e. the branding extensions 500 and 501) within the content 199 to obtain the graphical modifications to be made to display regions of the application that are separate from the content presentation region 176 of the application. Sub-steps 206 through 209 show details of this processing.

In step 206, for each streaming data feed 199 received by the application 150 that includes at least one branding extension 500, 501, the rendering application 150 accesses the branding content reference (i.e. the URL) to the branding content included in that branding extension 501 for that streaming data feed 199 to obtain and cache the branding content in association with the identification of the display portion (i.e., which part of the graphical user interface that extension is to be applied) of the application to which that branding extension is to be applied for that streaming data feed 199, prior to receiving a selection from the user to view content associated with that streaming data feed. In this manner, the branding data (e.g. the background content 178 in FIGS. 1, 2 and 3) can be retrieved and cached for future use prior to the user selecting the channel 199. In other words, once the rendering application 150 has been configured by the user 108 with data about which channels 199 that user is interested in, the rendering application can obtain the channel data 199 before the user actually selects a particular channel 199-1, 199-2 and so forth in the graphical user interface 160. Since the channel data is obtained beforehand, so to are the branding extensions and the branding content can also be pre-fetched so that when a user selects a channel 199 in the graphical user interface 160, the appropriate branding content 178 will be readily available.

In an alternative configuration, the branding content is re-obtained each time a user 108 re-selects a channel 199. This may be important if the branding content referenced by the branding extension 501 is dynamic and changes over time. Thus if the user selects channel 199-2 a first time, the rendering application 150 may be present the user 108 with the branding content 178 as shown in FIGS. 1 and 2. However, if the user re-selects this channel 199-2 a second time a few moments later, the rendering application can be configured to again obtain the branding content that may have changed. Step 207 through 209 show details of how the branding content is retrieved based on branding extensions 500 and 501.

In step 207, the rendering application 150 identifies a branding extension namespace (e.g. 500 in the above data format example) encoded into the streaming data feed 199. The branding extension namespace identifies a document type definition that defines branding tags associated with branding extensions.

In step 208, the rendering application 150 detects a branding tag 501 in the streaming data feed 199. The branding tag 501 provides an identification of a display region (e.g. background image in this example) of the application to which branding content 178 associated with (i.e. to be obtain with) a branding content reference assigned to that branding tag is to be applied. In other words, the application 150 can interpret the tag to determine what part of the display is to be effected by the branding content once it is obtained. Thus the tag can be associated to a particular part of the graphical user interface 160 of the rendering application 150. In a given channel 199 data format, there may be several branding extensions that each customize or modify a particular port of the graphical user interface that the application 150 renders. There can be branding extensions for many different application display regions, as well as for application controls, and even to specify certain application features that are to be enabled or disabled. In this manner, the branding extensions allow a content provider the ability to dictate how the content items for a channel are to be presented to the user.

In step 209, in response to detecting the branding tag 501, the rendering application 150 obtains branding content (e.g. the background image) referenced by the branding content reference (e.g. url) assigned to that branding tag contained in the streaming data feed 199. The branding content is to be displayed in a display region (e.g. background, or some subset of the graphical user interface) of the application 150 corresponding to the branding tag in response to the application 150 receiving a selection from the user to view content identified in the streaming data feed 199 for which that that branding tag is associated. The selection from the user that triggers the branding content to be obtained and applied can be, for example, the user's selection of a channel 199, or selection of a particular content item 175 within a channel.

In one configuration, the embedded modification information is a branding extension in a streaming data feed that includes a branding content reference to a new application skin that will replace a current application skin upon user selection of content associated with a streaming data feed containing the content for presentation to a user. In such cases, the branding extensions allow the application skin to dynamically change as a user selects different channels 199 or content items 175 within a channel. Steps 210 through 212 provide example processing to dynamically change application skin based on user selections of content or channels.

In step 210 the rendering application 150 accesses the branding content reference (e.g. a url to a new skin file) to load a wrapper file 167 containing the new application skin. The wrapper file 167 encodes application skin characteristics, such as border shape and color, button and control characteristics, font sizes, and so forth.

In step 211, the rendering application 150 retrieves and instantiates a skin class (in memory 112) within the newly loaded application skin 167 to access embedded skinning symbols within the skin class 167.

In step 212, the rendering application 150 applies a style defined in the skin class 167 to invoke display of the embedded skinning symbols within the skin class on a display region of the application corresponding to a branding tag defined in the branding extension. In this manner, the skin of the application dynamically changes to a new skin 167 as the user changes channels. This is shown by the different look and feel or the graphical user interface 160 in FIGS. 2, 3 and 4.

In another configuration, application styles can be dynamically changed and the embedded modification information is a branding extension in a streaming data feed 199 that includes a branding content reference to an application style 168 that will replace a current application style upon user selection of content associated with a streaming data feed containing the content for presentation to a user. In such cases, the branding extensions allow the application style to change as a user selects different channels or content items. Steps 213 through 215 provide example processing to dynamically change application style based on user selections of content or channels.

In step 213, the rendering application 150 accesses the branding content reference 501 to download a branding stylesheet 168 associated with the streaming data feed 199 that is associated with content selected for presentation to the user 108.

In step 214, the rendering application 150 parses the branding stylesheet 168 to identify brandable application classes associated with display items rendered by the application.

In step 215, the rendering application 150 operates a style manager to apply the branding style 168 defined in the branding style sheet associated with the content selected to each brandable application class so that display regions (e.g., 171, 172, 173, 178, etc.) corresponding to the brandable application classes adapt to the branding style defined in the branding stylesheet 168.

In step 216, the rendering application 150 alters at least one display region (e.g., 171, 172, 173, 178, etc.) of the application that is separate from the content display region 176 of the application in accordance with the graphical modifications 500, 501 identified by the embedded modification information within the content 199. Sub-steps 217 through 219 show details of this processing.

In step 217, the rendering application 150 detects a user selection of a content choice 199 or 175 associated with a streaming data feed 199 within a graphical region of the application. The branding extensions can thus be provided on a channel by channel basis, or more granularly on a content item by content item approach, such that as the user selects different content items 175 in the same channel, the branding changes.

In step 218, in response, the rendering application 150 determines if branding content (e.g. extensions) associated with the content choice is available for display.

In step 219, if branding content associated with the content choice 199 or 175 is available for display, the rendering application 150 displays the branding content in a display region (e.g., 171, 172, 173, 178, etc.) identified by the branding tag 501 of the branding extension associated to that streaming data feed 199 containing the content choice 175. The display region (e.g., 171, 172, 173, 178, etc.) in which the branding content is displayed is different than a content display region 176 of the application in which content associated with the content choice is to be displayed. In this manner, the branding extensions 500, 501 modify application operation and serve as an in-band control mechanism for application visual appearance and functionality.

While this invention has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims.

What is claimed is:

1. A method executed by a processor, comprising:
   displaying, on a display screen, at least one portion of a graphical user interface (GUI) initially rendered with application content;
   displaying a content presentation region in the GUI;
   in response to a selection of a representation of a first streaming content channel:
   applying a first application skin to the at least one portion of the GUI, the first streaming content channel providing access to a first content item and a reference to the first application skin; and
   displaying a representation of the first content item in the content presentation region while the first application skin is applied to the at least one portion of the GUI;
   in response to a selection of a representation of a second streaming content channel:
   terminating display of the first application skin; and
   applying a second application skin to the at least one portion of the GUI, the second streaming content channel providing access to a second content item and a reference to the second application skin.

2. The method as in claim 1, comprising:
   displaying a content viewing region in the GUI, the content viewing region visually separate from the at least one portion of the GUI and the content presentation region; and
   in response to a selection of the representation of the first content item, presenting, in the content viewing region, content identified by the representation of the first content item.

3. The method as in claim 1, comprising:
   in response to the selection of the representation of the second streaming content channel:
   terminating display of the representation of the first content item in the content presentation region.

4. The method as in claim 1, comprising:
   displaying a content viewing region in the GUI, the content viewing region visually separate from the at least one portion of the GUI and the content presentation region; and
   in response to a selection of the representation of the second content item, presenting, in the content viewing region, content identified by the representation of the second content item.

5. The method as in claim 1, wherein applying the first application skin to the at least one portion of the GUI includes:
   utilizing the reference to the first application skin to identify a remote location of at least one background image, the reference to the first application skin comprising a tag embedded in the first streaming content channel.

6. The method as in claim 5, comprising:
   obtaining the at least one background image from the remote location; and
   modifying at least one GUI property visible in the at least one portion of the GUI according to at least one visual characteristic of the at least one background image.

7. The method as in claim 6, wherein modifying the at least one GUI property visible in the at least one portion of the GUI according to the at least one visual characteristic of the at least one background image includes:

displaying a modified GUI property in the at least one portion of the GUI, wherein the modified GUI property portrays a visual similarity to the at least one background image.

8. The method as in claim 1, wherein applying the first application skin to the at least one portion of the GUI includes:
   utilizing the reference to the first application skin to identify a remote location of at least one graphical modification associated with the first application skin, the reference to the first application skin comprising a tag embedded in the first streaming content channel; and
   obtaining the at least one graphical modification from the remote location; and
   modifying at least one pull-down menu, accessible via the at least one portion of the GUI, according to the at least one graphical modification.

9. The method as in claim 8, wherein modifying at least one pull-down menu, accessible via the at least one portion of the GUI includes:
   upon detecting a request to present the at least one pull-down menu, displaying the at least one pull-down menu, wherein the at least one pull-down menu includes at least one visual characteristic modified according to the at least one graphical modification.

10. The method as in claim 1, wherein applying the first application skin to the at least one portion of the GUI includes:
    modifying, according to at least one visual characteristic of the first application skin, the application content currently visible in the at least one portion of the GUI, the at least one portion of the GUI displayed as visually separate from the content presentation region.

11. A non-transitory computer-readable medium having instructions stored thereon, the instructions comprising:
    instructions for displaying, on a display screen, at least one portion of a graphical user interface (GUI) initially rendered with application content;
    instructions for displaying a content presentation region in the GUI;
    instructions for, in response to a selection of a representation of a first streaming content channel:
    applying a first application skin to the at least one portion of the GUI, the first streaming content channel providing access to a first content item and a reference to the first application skin; and
    displaying a representation of the first content item in the content presentation region while the first application skin is applied to the at least one portion of the GUI; and
    instructions for, in response to a selection of a representation of a second streaming content channel:
    terminating display of the first application skin; and
    applying a second application skin to the at least one portion of the GUI, the second streaming content channel providing access to a second content item and a reference to the second application skin.

12. A system comprising:
    a processor;
    a memory that stores instructions that when executed by the processor perform instructions comprising:
    displaying, on a display screen, at least one portion of a graphical user interface (GUI) initially rendered with application content;
    displaying a content presentation region in the GUI;
    in response to a selection of a representation of a first streaming content channel:
       applying a first application skin to the at least one portion of the GUI, the first streaming content channel providing access to a first content item and a reference to the first application skin;
       displaying a representation of the first content item in the content presentation region while the first application skin is applied to the at least one portion of the GUI; and in response to a selection of a representation of a second streaming content channel:
    terminating display of the first application skin;
    applying a second application skin to the at least one portion of the GUI, the second streaming content channel providing access to a second content item and a reference to the second application skin.

* * * * *